Dec. 1, 1970  G. R. BULL  3,543,486
METHOD OF HARVESTING FRUIT
Filed May 29, 1967  5 Sheets-Sheet 1
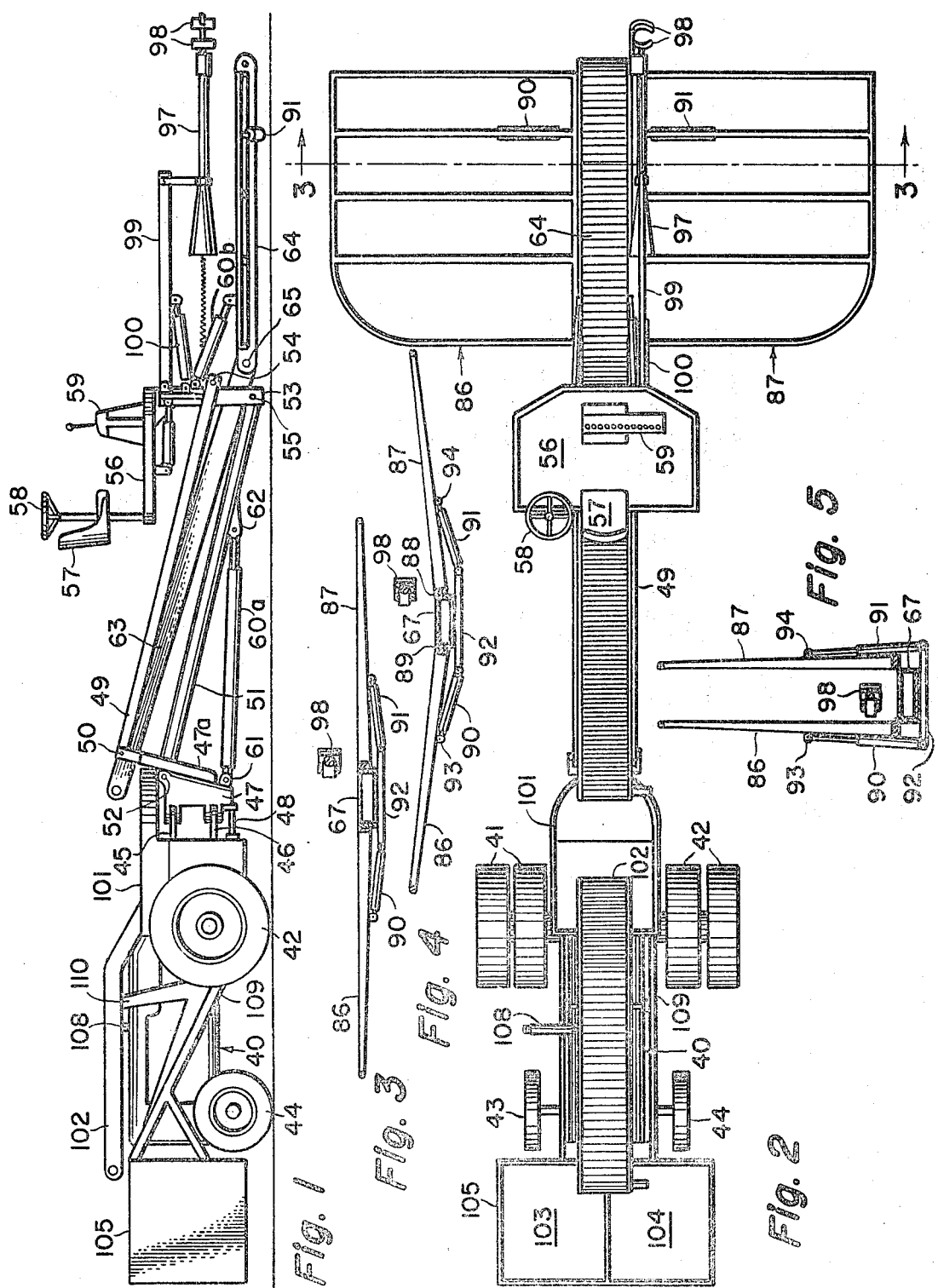
INVENTOR.
George Rodney Bull
BY
*James B. Evans*
ATTORNEY Dec. 1, 1970   G. R. BULL   3,543,486
METHOD OF HARVESTING FRUIT
Filed May 29, 1967   5 Sheets-Sheet 2
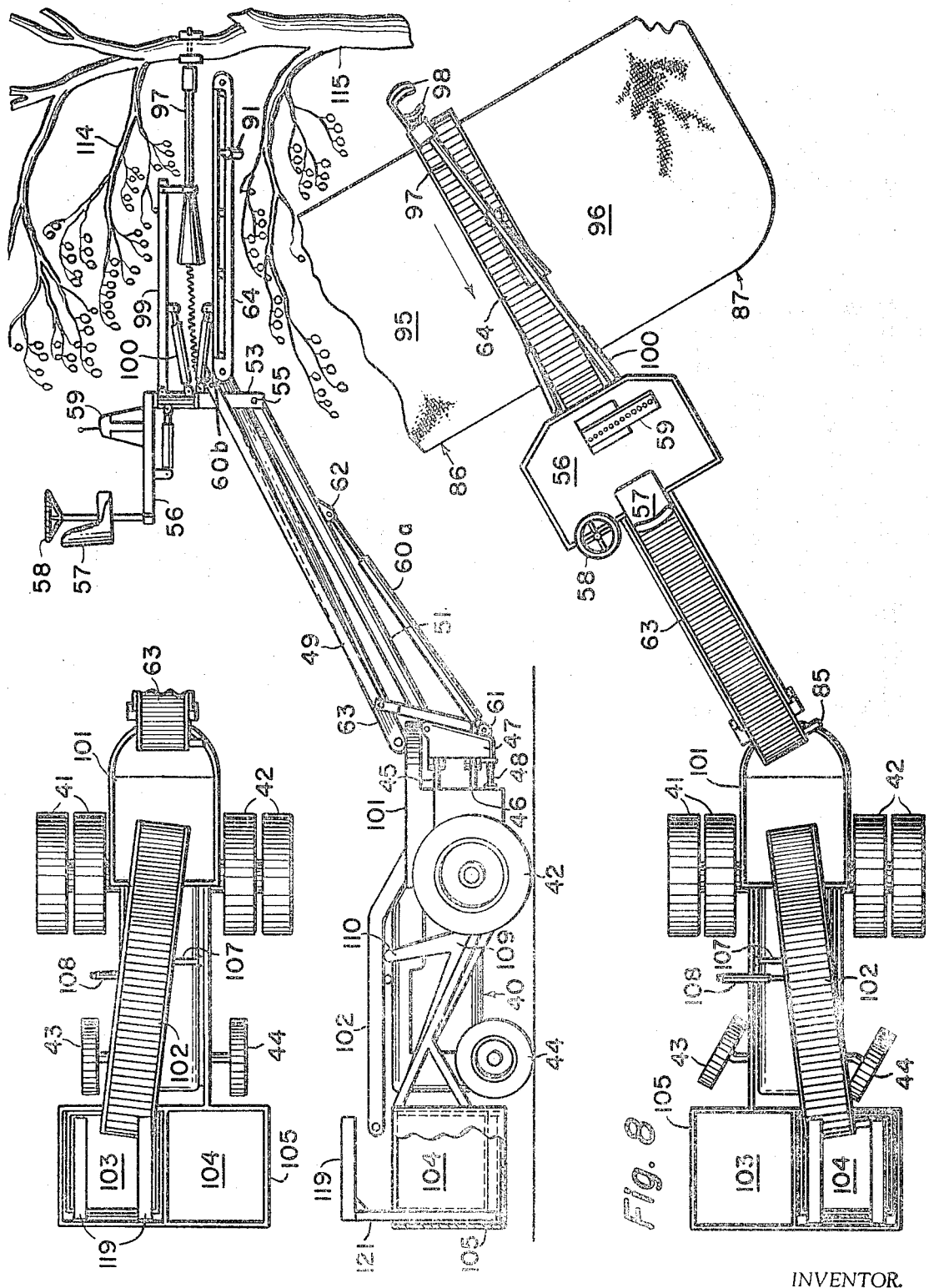
INVENTOR.
George Rodney Bull
BY
ATTORNEY

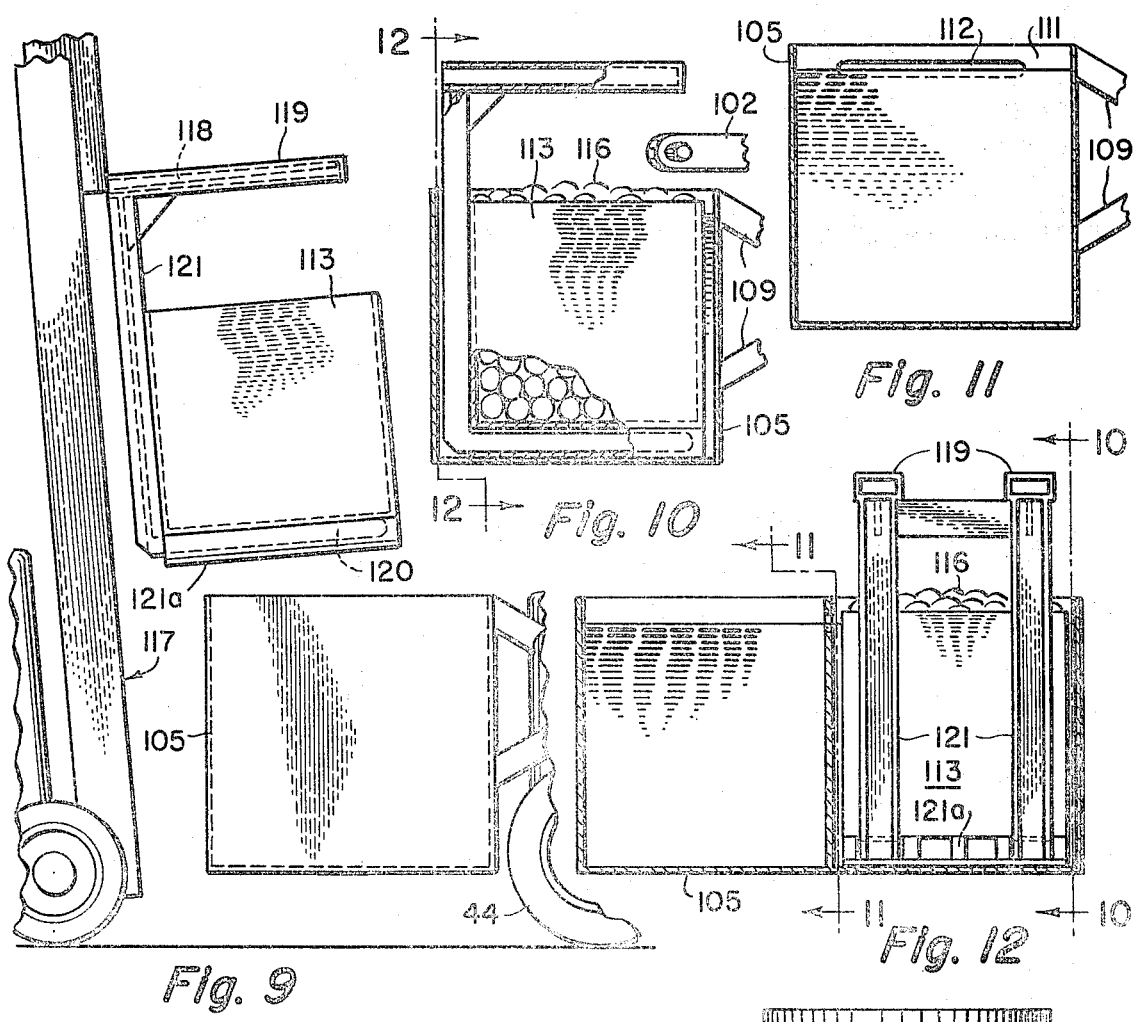

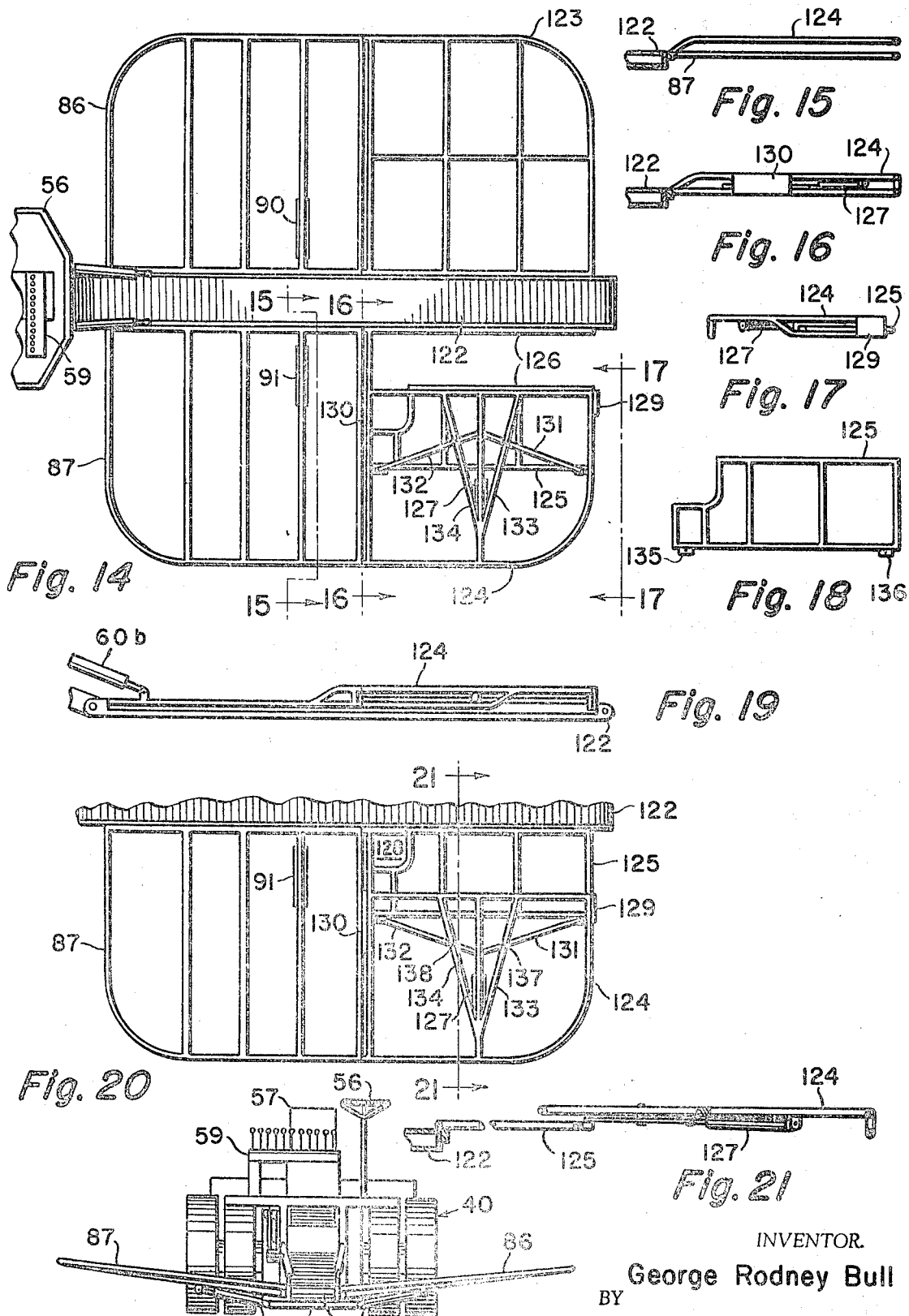

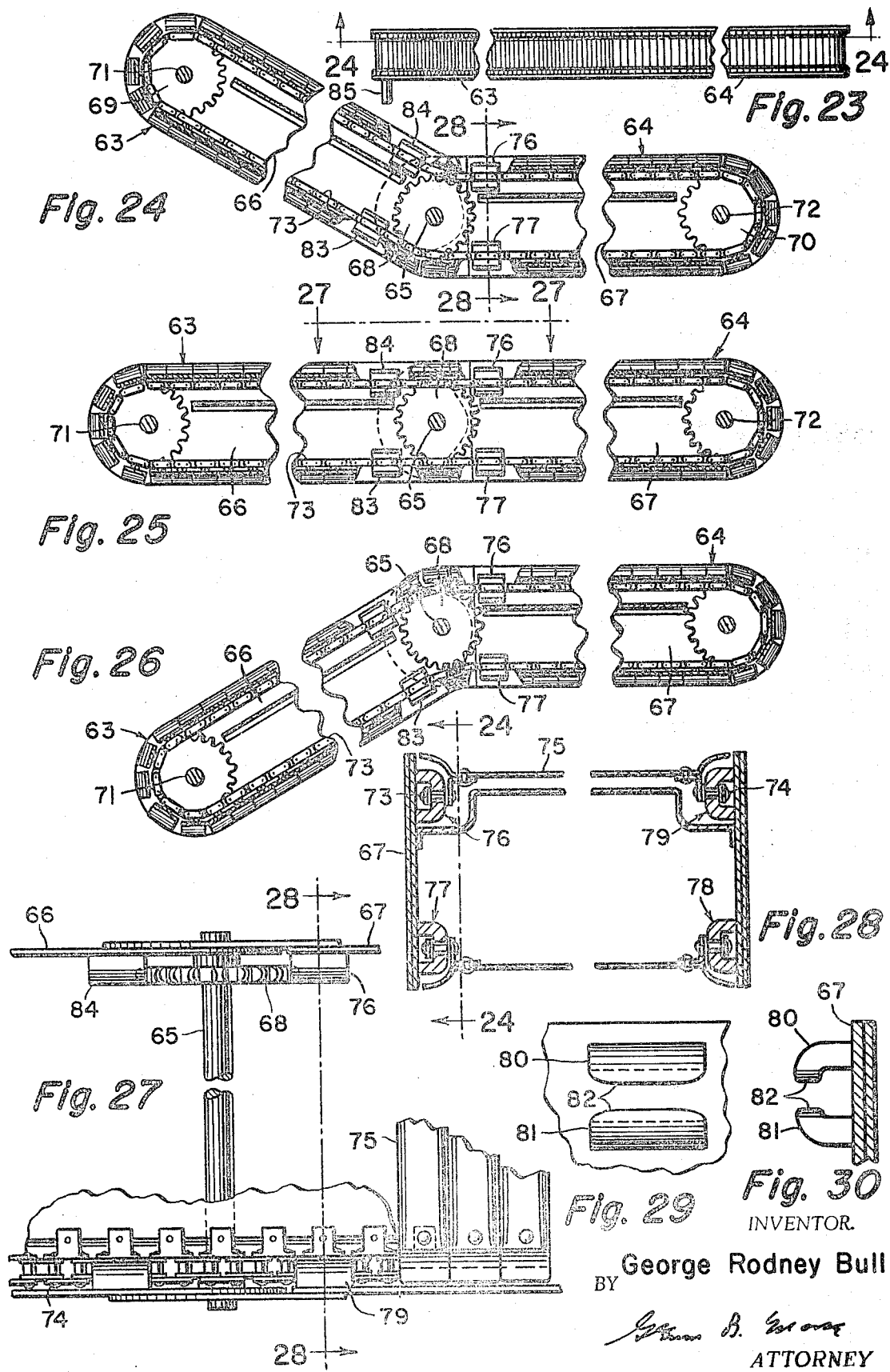

United States Patent Office 3,543,486
Patented Dec. 1, 1970

3,543,486
METHOD OF HARVESTING FRUIT
George Rodney Bull, 750 Canada Ave.,
Bailey, Mich. 49303
Filed May 29, 1967, Ser. No. 641,818
Int. Cl. A01g 19/08
U.S. Cl. 56—1          3 Claims

ABSTRACT OF THE DISCLOSURE

A harvesting machine with substantially flat fruit-receivers insertable laterally between branches of trees, the receivers being inclinable to roll fruit shaken from a limb above the receiver onto a conveyor. The machine also has a system for loading the fruit into successive containers submerged in water, with a shiftable conveyor switching from one container to another for continuous operation as the containers are alternately loaded and handled with a special device for positioning them in separate tank compartments. Both the picking and loading mechanisms have articulating conveyors, and the transfer of fruit from one to another is made via a separate central tank on a vehicle, with the loading and the picking structures being on opposite sides for balance.

SUMMARY OF THE INVENTION

The technique of harvesting fruit crops by shaking the trees has been developed to the point where the removal of the fruit from the tree can be performed very effectively without damaging the tree. This technique has been so revolutionary, however, that the handling of the fruit after it has been separated from the tree has not been sufficiently developed to fully utilize the shaking procedure. Receiving devices of various descriptions have been placed underneath the tree, with the receiver being sufficiently inclined so that the falling fruit moves over to a point of collection. These arrangements have not been fully satisfatcory, however, in view of the distance through which the fruit must fall before it engages the receiver, and the subsequent tumbling action as the entire mass of falling fruits finds its way to the collecting equipment. The problem of avoiding bruising of the fruit is complicated by the tremendous surge of fruit that comes down all at once when a shaking operation is applied to a major limb. To a limited extent, this can be controlled by the intensity of the applied shaking, but the distance of free fall of the fruit down to the receiver is still substantial enough to produce bruising, and the placement of the receiver in position around the base of the tree is a time-consuming procedure.

The present invention provides a completely mobile self-contained harvesting operation that can be controlled by a single operator. Separate placement of receivers around the base of the tree is eliminated, and the distance of free fall of the fruit is reduced to a few inches. Fruit is then conveyed to a station on the machine in which containers are loaded in a bruise-free operation. The containers are placed in compartments of a tank containing water, so that the fruit may be dropped into the containers without injury. As the fruit continues to accumulate, the water is permitted to overflow from one compartment to the other, thus avoiding the need for replacement of the water. The height of the tank is selected such that the flotation effect of buoyant fruit, when the level approaches the overflow point, will correspond approximately to a full submerged container. Removal of the container with a special device that reaches down into the tank between the container and the tank wall will permit the container to drain free so that the resulting container is filled with fruit alone. The removal device is designed to accommodate the tines of a fork-lift vehicle for simplicity in handling substantial loads.

The transfer of the fruit from the picking equipment over to the loading mechanism involves the shifting of the fruit from one conveyor to another, and this operation is also conducted via a tank of water. The dropping of the fruit from the picking conveyor, and the removal of it with the loading conveyor, is thus accomplished without interference from the articulation of the conveyors as the load conveyor switches from one position to another, and as the picking conveyor moves during the harvesting operation. The presence of a transfer tank in the central portion of the vehicle also permits considerable accumulation of the fruit at this point, in the event that it becomes necessary to temporarily halt the operation of the loading conveyor. The placement of the picking and harvesting equipment at opposite sides of the vehicle produces a tendency to balance out the gravity forces so that the vehicle is sufficiently stable to move across rough ground.

DETAILED DESCRIPTION

The several features of the invention will be analyzed in detail through a discussion of the particular embodiments illustrated in the accompanying drawings. In the drawings:

FIG. 1 is a side elevation of the complete harvesting unit, in the lowered position.

FIG. 2 is a top view of the device in the position shown in FIG. 1.

FIG. 3 is a section on the plane 3—3 of FIG. 2.

FIG. 4 is a section on a plane similar to that of FIG. 3, showing the fruit-receiving members inclined toward the central conveyor.

FIG. 5 shows the fruit-receiving units in the folded position.

FIG. 6 is a plan view of the opposite side of the vehicle from the picking equipment, and showing the loading station.

FIG. 7 is a side elevation of the machine shown in FIG. 1, with the picking device in the elevated position and inserted between the branches of a tree.

FIG. 8 is a plan view of a machine in the FIG. 7 position.

FIG. 9 is a view on an enlarged scale showing the handling of a container with a lift truck, in the process of placing the container into the tank of water.

FIG. 10 is a fragmentary view showing the container loaded with fruit preparatory to being removed from the tank.

FIG. 11 shows a tank of water with the fruit container removed.

FIG. 12 is a section on the plane 12—12 of FIG. 10.

FIG. 13 shows the manner of switching of the loading conveyor from a container in one tank section to the opposite tank section.

FIG. 14 shows a plan view of a modified form of fruit receiver.

FIG. 15 is a section on the plane 15—15 of FIG. 14.

FIG. 16 is a section on the plane 16—16 of FIG. 14.

FIG. 17 is a view on the plane 17—17 of FIG. 14.

FIG. 18 is a view of a closure member associated with the structure shown in FIG. 14.

FIG. 19 is a side elevation of the device shown in FIG. 14.

FIG. 20 is a view of the device shown in FIG. 14, with the closure member actuated to the closed position.

FIG. 21 is a view on the plane 21—21 of FIG. 20.

FIG. 22 is a front view of the unit shown in FIG. 2, with the receiver components in the inclined position.

FIG. 23 is a plan view of an articulating picking conveyor associated with either the FIG. 1 or FIG. 14 devices.

FIG. 24 is a section on the plane 24—24 of FIG. 2, on an enlarged scale.

FIG. 25 is a side elevation of the conveyor shown in FIG. 23, in the in-line condition, as opposed to the articulated condition shown in FIG. 24.

FIG. 26 shows an articulated position of the conveyor of FIG. 23, bent in the opposite direction from that of FIG. 24.

FIG. 27 is a view on an enlarged scale on the plane 27—27 of FIG. 25.

FIG. 28 is a view on the plane 28—28 FIG. 27.

FIG. 29 is a view on an enlarged scale of one set of guide members used in the articulating conveyor structure.

FIG. 30 is an end view of the guide members shown in FIG. 29.

The machine shown in FIG. 1 is mounted on a modified tractor chassis generally indicated at 40, and is provided with the rear wheels 41–42 and front wheels 43–44. This chassis contains an engine (not shown) which renders the entire machine mobile, and provides power for actuating the various hydraulic systems. The brackets 45 and 46 provide rotatable support for the member 47, which moves on a normally vertical axis under the action of the hydraulic piston-cylinder unit 48, which may be on one or both sides of the machine, disposed eccentrically to the axis of the pivotal mounting of the member 47. The member 47a functions as an extension to the member 47, and provides a pivotal mounting for the upper link 49 on the pin 50. The lower link 51 is pivotally secured at the pin 52 to the member 47. The opposite ends of the links 49 and 51 are pivotally secured to the member 53 by the pins 54 and 55, respectively. The links 49 and 51 are duplicated at the opposite sides of the machine, and provide what amounts to a parallelogram-type linkage for maintaining a generally horizontal position of the platform 56 carrying the operator's seat 57, the steering wheel 58, and control panel 59. Suitable conventional remote control systems interrelate the control panel 59 and the steering wheel 58 with the vehicle 40 and the associated equipment. These control details are not shown in the drawings. The hydraulic pistons-cylinder assembly 60a extends from the bracket 61 on the member 47 to the bracket 62 on the lower link 51 to control the elevation of the platform 56. FIG. 7 illustrates an elevated position of which the device is capable, under the manipulation of the controls associated with the panel 59. Movement of the device from left to right (as seen in FIGS. 1 and 7), and vice versa, is controlled by power delivered to the wheels 41 and 42. Articulation on a vertical axis, so that the plate form 56 swings about in a horizontal plane, is accomplished by control of the piston-cylinder mechanism 48, which is also under the control of the panel 59.

The linear conveyor section 63 is secured with respect to the members 47 and 53 in such a manner that the conveyor section is permitted to pivot with respect to these members, while being supported against substantial lateral displacement. This support of the conveyor section 63 can either be through means engaging the members 47 or 51. It is necessary, however, that the connecting points on the conveyor section 63 be able to accommodate any differences in location between those points and the pivotal connections at the opposite ends of the links so that the resultant structure does not bind as it moves from the lowered position of FIG. 1 to the upper positions indicated in FIG. 7.

The outer conveyor section 64 is pivotally connected to the conveyor section 63 on the shaft 65 so that the two conveyor sections 63 and 64 form a continuous structure devolped by a single belt system. The details of this portion of the picking conveyor are best shown in FIGS. 24 through 30. The conveyor sections 63 and 64 include the beam structures 66 and 67, respectively, which are pivotally interconnected by the shaft 65. This shaft also provides for the rotatable support of the sprockets 68 on opposite sides of the device. The sprockets 69 and 70 are similarly supported on the shafts 71 and 72 disposed at the opposite ends of the beam structures 66 and 67. This group of sprockets defines the path for the parallel endless chains 73 and 74 which have the interconnecting slats 75 extending between them to convey various articles that may be deposited on the conveyor system.

In view of the necessity for the picking conveyor (which includes the sections 63 and 64) to articulate from the FIG. 24 to the FIG. 26 position under the control of the cylinders 60b, through the position of alignment shown in FIG. 25, it becomes necessary to confine the chains 73 and 74 in the neighborhood of the sprockets 68. This confinement is obtained through the placement of four pairs of guide members on each side of the machine, as shown in FIGS. 28, 29, and 30. Certain of these pairs are indicated generally at 76–79 in FIG. 28, and are all constructed as shown in FIGS. 29 and 30. The curved steel fingers indicated at 80 and 81 are secured to the beam structures 66 and 67 by welding, or any other convenient system. They are hooked as shown in FIG. 30 to provide the proper space at 82 for admitting the rollers of the conventional chain, while maintaining placement of the side plates interconnecting the rollers on opposite sides of the space 82. In FIG. 26, the guide members 77 and 83 maintain the chain 73 in engagement with the sprocket 68; and in the FIG. 24 position, the guide members 76 and 84 do the same thing for the opposite course of the chain 73. Similar structure on the opposite side of the machine maintains the engagement of the chain 74 during the articulation of the conveyor sections. Power is delivered to the conveyor sections in all positions by a conventional motor as indicated at 85, driving the shaft 71.

The fruit-receivers 86 and 87 are pivotally connected to the opposite sides of the beam structure 67 at 88 and 89, respectively, so that they may be positioned between the flat attitude shown in FIG. 3, through the inclined position of FIG. 4, to the folded position shown in FIG. 5. This movement is generated by the hydraulic cylinders 90 and 91 under the control of the panel 59. These cylinders extend from the short transverse beam 92 secured to the structure 67 to points of connection with the receivers 86 and 87, respectively, at 93 and 94. The receivers 86 and 87 are essentially frames supporting a netting or fabric as shown at 95 and 96 in FIG. 8, and provide resilient platforms on which the fruit may drop as it is separated from the tree under the action of the conventional shaking device generally indicated at 97. This device has clamping jaws as shown at 98 which can be engaged with a selected limb of a tree, in the manner shown in FIG. 7. The shaking device then applies a shaking action of sufficient intensity to cause the fruit on the limb of the tree to fall downward onto the receivers 86 and 87. The shaking device 97 is preferably mounted on a boom 99 positioned by the hydraulic cylinder 100. This equipment is also under the control of the panel 59. After the fruit has fallen down onto the fabric or netting 95 and 96, inclination of the receivers 86 and 87 to the FIG. 4 position will induce the fruit to roll toward the conveyor section 64, the upper course of which is moving in the direction of the arrow shown in FIG. 8. The fruit is thus carried back along the conveyor sections 64 and 63, and dropped into the central transfer tank 101, which is at least partially filled with water. The fruit is withdrawn from the this tank by the loading conveyor 102, which is capable of switching from the positions shown in FIG. 6 and FIG. 8 to deliver fruit to a container mounted either in the compartment 102 or the compartment 104 of the tank 105. To accommodate this switching movement, the loading conveyor 102 is pivotally connected to the central transfer tank structure as indicated at 106 in FIG. 13. The conveyor 102 is slidably supported on the bar 107, with the switching movement controlled by the hydraulic cylinder 108. The support of the tank 105 and the bar 107 can be provided by any desired structure mounted on the vehicle 40, but it is preferable to utilize standard equipment insofar as is possible. The forwardly-extending beam structure indicated at 109 is conventionally provided for supporting plows or scoop devices (not used with the present invention), and forms a convenient point for the attachment of the tank 105. The upward extension 110 of this beam assembly is also conventional, and will normally provide a convenient point of attachment for the bar 107. The beam assembly 109 is frequently pivotally attached to the underside of the vehicle 40 at a point near or slightly forward of the axis of the rear wheels 41 and 42, with the beam assembly having similar components disposed on the opposite sides of the vehicle.

The tank sections or compartments 103 and 104 are separated by a partition 111 provided with an overflow opening as indicated at 112 in FIG. 11. At the beginning of a loading operation, a perforate container 113 is placed in either compartment, such as within the compartment 103 shown in FIG. 6. Water in the compartment 103 will normally be somewhere from half of the depth in the tank up to the overflow opening 112. Fruit is then delivered from the conveyor 102 switched to the FIG. 6 position, this fruit being withdrawn from the central transfer tank 101 to which it is supplied by the picking conveyor 63, as fruit is removed from the limb 114 of the tree 115 by the shaking device 97. If the loading conveyor 102 has halted its operations for switching between the compartments 103 and 104, it is possible that a considerable quantity of fruit may have accumulated in the transfer tank 101 as the picking operation has proceeded. In any case, the fruit is permitted to accumulate to about the level of the top of the tank 105, as shown in FIG. 10. This fruit, indicated at 116 may be of a buoyant nature, as in the case of appples. The tank 105 is slightly above the top edge of the container 113, which will permit the desired quantity of apples to be present in the compartment 103, as the raising level of water approaches and is finally limited by the overflow opening 112.

As the level of apples reaches the desired point, the conventional lift truck 117 engages its spaced tines 118 in the tubular tine-receivers 119 of a special handling device. This device has the lifting beams 120 mounted at the lower extremity of the normally vertical extension 121, which permits the lifting device to reach down into the tank 105 between the container 113 and the tank wall. In effect, the lifting members 120 of the device replaces the tines 118 of the lift truck for engagement with the conventional skid openings defined by the structure 121a on the underside of the container 113. The presence of the water in the tank 105 cushions the fall of the fruit 116 from the loading conveyor, and the overflow of the water from the tank compartment 103 to the compartment 104 permits the water to be continuously recycled from one side to the other as the loading operation proceeds. A container 113 can be placed in the compartment 104 during the loading of the container in the compartment 103. When the container in compartment 103 is filled, the conveyor 102 may immedately be switched to the compartment 104 to commence loading at that position, permitting the container in compartment 103 to be removed through the use of the lifting device, which will stay in position as long as the container is within the tank. The containers 113 are of standard dimensions, and of quite substantial size, frequently in excess of a cubic yard. The volume of water within the tank 105 will therefore have sufficient weight to give a very desirable balancing effect for the picking structure at the opposite side of the vehicle.

The modification shown in FIGS. 14 and 22 centers in the structure of the receiver which functions in conjunction with the picking equipment. The FIG. 14 arrangement may be used where it is practical to embrace an entire trunk of a tree (or a large limb) rather than restricting the shaking operation to a relatively small limb. The picking conveyor 122 is similar in construction, but of approximately twice the length of the conveyor 64 shown in FIGS. 1 and 2. The receivers 86 and 87 are similar to the receivers shown in FIG. 2, and are manipulated with regard to inclination by similar cylinders 90 and 91 so that the pivotal connection of the receivers to the conveyor 122 will produce an effect similar to that illustrated in FIGS. 3, 4, and 5. The auxiliary receivers 123 and 124 are also pivotally connected to the conveyor 122, and additionally are secured to the receiver sections 86 and 87, respectively. The unit 124 has a retractable section 125 capable of movement from the FIG. 14 to the FIG. 20 positions. In the retracted position shown in FIG. 14, a gap as shown at 126 is provided between the receiver and the conveyor so that the entire device can be engaged at this point with a large limb or with the trunk of a tree. After the limb or trunk has been fully engaged with this gap, the retractable unit 125 is thrown to the closed position shown in FIG. 20 by the action of the hydraulic cylinder 127. This action leaves the trunk or limb entrapped in the small opening 128, with the result that the limb or trunk is completely surrounded by a fruit-receiving surface capable of inclination toward the conveyor 122. The sliding movement of the receiver section 125 with respect to the section 124 is determined by suitable guide members as shown at 129, and similar structure 130 on the opposite side of the unit 124. The frames of the receiver sections 123, 124, and 125 will also normally be covered by netting or fabric, and are shown in FIGS. 14 through 20 without this covering, in order to clarify the structure. A shorter stroke of actuation may be utilized for the cylinder 127 by the provision of the levers 131 and 132 pivotally mounted on the diagonals 133 and 134. The junction of the members 131 and 132 is connected to the piston rod of the piston-cylinder assembly 127, and the outer extremities of these levers are connected to the brackets 135 and 136 on the movable receiver section 125. Actuation of the cylinder 127 will therefore throw the levers 131 and 132 from the FIG. 14 to the FIG. 20 position, rotating about the points 137 and 138, respectively. The position of these fulcra are such as to magnify the stroke of the cylinder assembly 127. It should be noted in passing that the connection between the levers 131 and 132 and the brackets 135 and 136 must accommodate a small degree of lateral motion as a result of the cosine function involved in this form of connection. The same is true of the connection between the levers 131 and 132 and the central piston assembly. An alternative would be a fixed-axis connection at the cylinder, with some degree of lateral motion accommodated both at the fulcra 137 and 138 and at the brackets 135 and 136.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. A method of harvesting fruit from a tree, comprising:
   inserting a substantially flat receiver laterally into a tree between the branches thereof, and subsequently inclining said receiver sufficiently to induce movement of fruit to the edge of said receiver;
   separating fruit from the branches of said tree above said receiver; and
   conveying said fruit from the said edge to an accumulating station.

2. A method as defined in claim 1, wherein said separating is accomplished by shaking selected limbs extending above said receiver.

3. A method as defined in claim 1, wherein said receiver is inclined subsequently to the separation of the fruit from the branches.

References Cited

UNITED STATES PATENTS

| | | | |
|---|---|---|---|
| 2,996,868 | 8/1961 | Voelker | 56—328 |
| 3,040,507 | 6/1962 | Lasswell | 56—328 |
| 3,129,551 | 4/1964 | Lasswell | 56—328 |
| 3,225,529 | 12/1965 | King | 56—328 |
| 3,347,587 | 10/1967 | Frost | 56—328 XR |
| 3,362,145 | 1/1968 | Steingas et al. | 56—328 |
| 3,377,786 | 4/1968 | Edgemond | 56—328 |

RUSSELL R. KINSEY, Primary Examiner

U.S. Cl. X.R.

56—328